(12) United States Patent
Moribe

(10) Patent No.: US 12,462,133 B2
(45) Date of Patent: Nov. 4, 2025

(54) IMAGE FORMING APPARATUS FOR FORMING STORED IMAGE DATA ON A PRINT MEDIUM, IMAGE FORMING METHOD, AND NON-TRANSITORY COMPUTER-READABLE STORAGE MEDIUM

(71) Applicant: CANON KABUSHIKI KAISHA, Tokyo (JP)

(72) Inventor: Shoei Moribe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 18/481,929

(22) Filed: Oct. 5, 2023

(65) Prior Publication Data
US 2024/0119244 A1 Apr. 11, 2024

(30) Foreign Application Priority Data
Oct. 7, 2022 (JP) .................................. 2022-162595

(51) Int. Cl.
*G06K 15/02* (2006.01)
*G03G 15/00* (2006.01)

(52) U.S. Cl.
CPC ..... *G06K 15/1825* (2013.01); *G03G 15/5029* (2013.01); *G06K 15/1852* (2013.01); *G06K 2215/101* (2013.01)

(58) Field of Classification Search
USPC ........................................................ 358/3.01
See application file for complete search history.

(56) References Cited

U.S. PATENT DOCUMENTS

| 6,025,929 A | 2/2000 | Nakajima et al. |
|---|---|---|
| 8,939,528 B2 | 1/2015 | Yamanobe |
| 8,941,876 B2 | 1/2015 | Tamagawa |
| 2011/0193902 A1 | 8/2011 | Yamanobe |
| 2013/0128286 A1* | 5/2013 | Tamagawa ............. H04N 1/605 358/1.2 |
| 2020/0213476 A1* | 7/2020 | Tsuji .................. G03G 15/0194 |

FOREIGN PATENT DOCUMENTS

| JP | H1013674 A | 1/1998 |
|---|---|---|
| JP | 2011161822 A | 8/2011 |
| JP | 2013107336 A | 6/2013 |

* cited by examiner

*Primary Examiner* — Jacky X Zheng
(74) *Attorney, Agent, or Firm* — Canon U.S.A., Inc. IP Division

(57) ABSTRACT

An image forming apparatus according to the present disclosure stores image data of an image having a plurality of regions, the plurality of regions having stepwise different densities, including a first region, a second region, and a third region between the first region and the second region, and satisfying a relationship of a moisture amount in the first region<a moisture amount in the third region<a moisture amount in the second region, and forms the stored image data on a print medium.

12 Claims, 13 Drawing Sheets

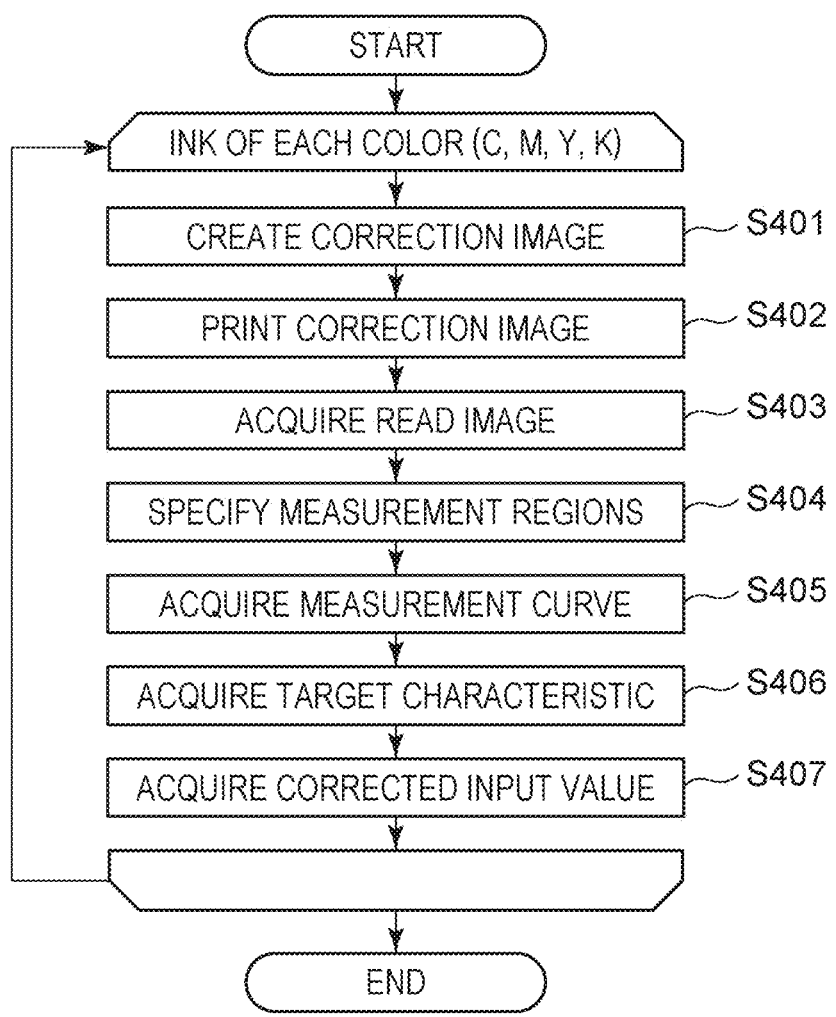

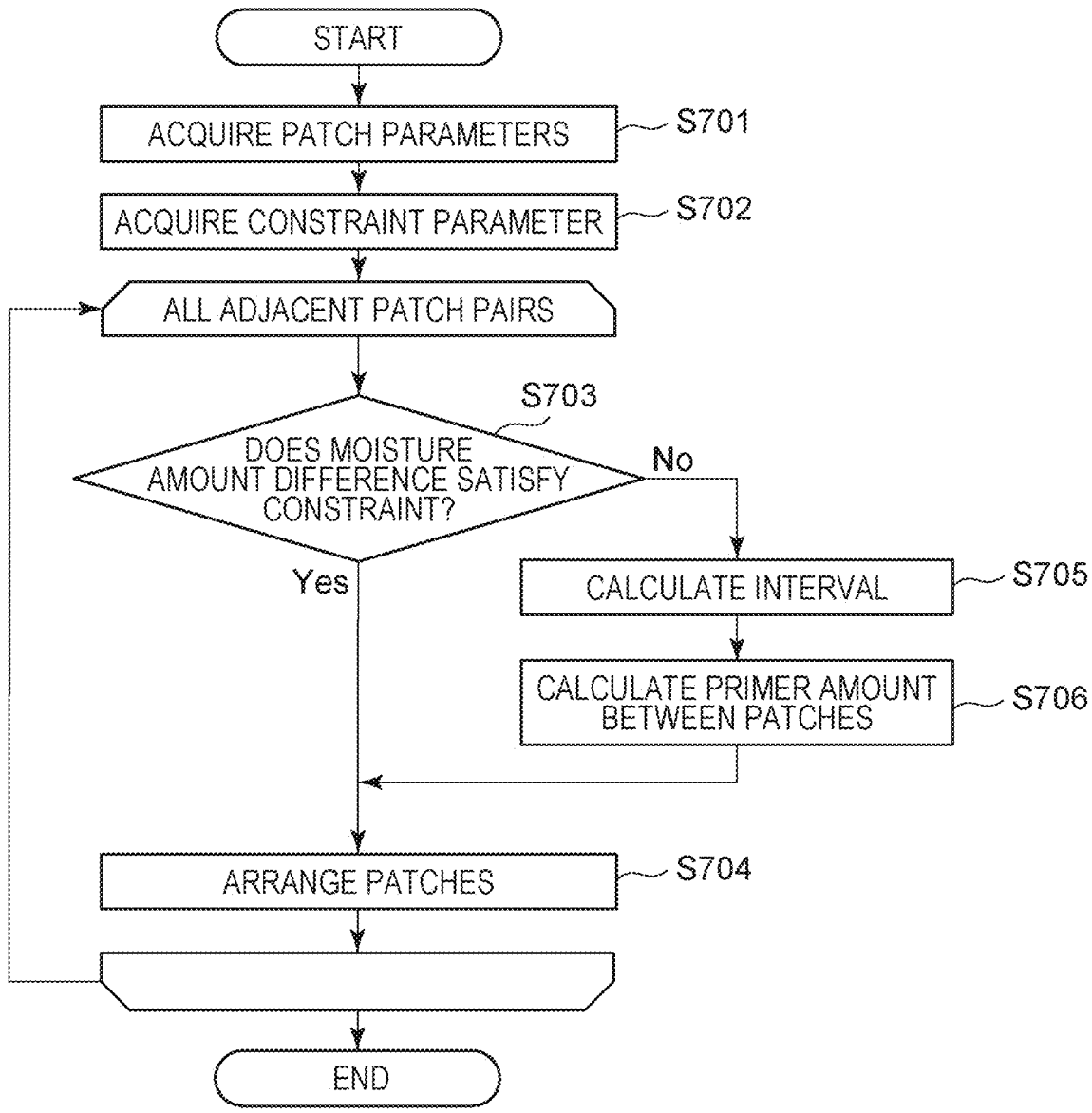

IMAGE FORMING APPARATUS FOR FORMING STORED IMAGE DATA ON A PRINT MEDIUM, IMAGE FORMING METHOD, AND NON-TRANSITORY COMPUTER-READABLE STORAGE MEDIUM

BACKGROUND

Field of the Disclosure

The present disclosure relates to a technique for acquiring a characteristic of an image processing apparatus while suppressing sheet deformation.

Description of the Related Art

A recording head used in an inkjet recording apparatus may have variations in discharge amount among a plurality of nozzles due to a manufacturing error or the like. When there are such variations in the discharge amount, density unevenness is likely to occur in an image to be recorded. In the related art, HS (Head Shading) processing described in Japanese Patent Laid-Open No. 10-013674 is known as processing for reducing the density unevenness. In the HS processing, image data to be recorded is corrected according to the information on the discharge amount of each nozzle. In order to acquire the discharge amount of each nozzle herein, a characteristic acquisition image is printed and measured by a scanner or the like. Then, in accordance with the measurement result, the image data is corrected so as to increase or decrease the number of ink dots to be recorded for each nozzle or for each plurality of nozzles. Thus, it is possible to correct the density unevenness in the recorded image.

In addition, color correction processing using a color conversion table is known in order to make the color of a printed material a desired color. Since the color of a printed material depends on characteristics of a recording apparatus, for example, a printed image for color correction is measured by a colorimeter, and CMYK values corresponding to desired CIEL*a*b* values are calculated from the correspondence between the CIEL*a*b* values obtained by the colorimeter and the CMYK values of the recording apparatus.

On the other hand, there is a known problem that, when an image is printed on a print sheet using a water-based ink, the print sheet is deformed by moisture and the quality of the printed material is impaired. In a case where the sheet deformation occurs in the characteristic acquisition image used for the HS processing or the color correction, the result measured by the scanner or the colorimeter is affected by the sheet deformation, and in some cases, it is not possible to correctly acquire a characteristic of the printer.

In the technique described in Japanese Patent Laid-Open No. 2011-161822, by reducing a moisture amount difference between an image portion to which ink is applied and a non-image portion (white background portion) to which ink is not applied, the sheet deformation caused by a local moisture amount difference is suppressed.

SUMMARY

An image forming apparatus according to an aspect of the present disclosure includes a storage unit storing image data of an image having a plurality of regions, the plurality of regions having stepwise different densities, including a first region, a second region, and a third region between the first region and the second region, and satisfying a relationship of a moisture amount in the first region<a moisture amount in the third region<a moisture amount in the second region, and an image forming unit configured to form the stored image data on a print medium.

Further features of various embodiments will become apparent from the following description of exemplary embodiments with reference to the attached drawings.

BRIEF DESCRIPTION OF THE DRAWINGS

FIG. 4 is a flowchart of HS processing.

FIG. 7 is a flowchart for creating the HS correction image in the first embodiment.

DESCRIPTION OF THE EMBODIMENTS

Figure 8A:
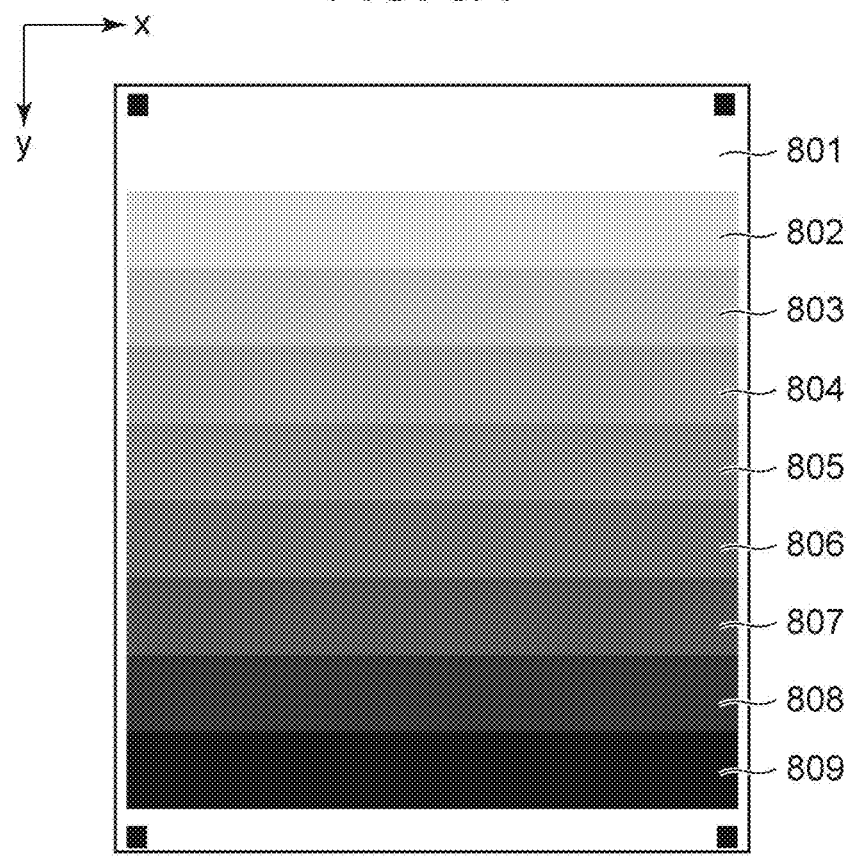
FIGS. 8A and 8B illustrate an example of an HS correction image in the related art.

With the technique in Japanese Patent Laid-Open No. 2011-161822, in some cases, it is not possible to sufficiently suppress the sheet deformation that occurs in the characteristic acquisition image used for the HS processing and the color correction. FIG. 8A illustrates an example of the characteristic acquisition image for the HS processing. Patches 801 to 809 of nine tones are recorded with black ink on a print sheet. At this time, by applying the technique described in Japanese Patent Laid-Open No. 2011-161822, for example, a transparent liquid can be applied to the non-image portion (white background portion) around the patch 809 to reduce the local moisture amount difference. However, it is not possible to reduce the moisture amount difference between the patch 808 and the patch 809. The reason for this is that, when the transparent liquid is applied to the patch 808, the density of the patch 808 changes, and in some cases, it is not possible to correctly acquire a characteristic to be used for the HS processing.

Therefore, the present disclosure will describe embodiments for providing a characteristic acquisition image by which a characteristic of an image forming apparatus can be acquired while suppressing sheet deformation.

Hereinafter, the embodiments of the present disclosure will be described with reference to the drawings. It should be noted that the following embodiments do not limit every embodiment of the present disclosure, and all combinations of features described in the embodiments are not necessarily essential to the solving means of the present disclosure.

First Embodiment

Hardware Configuration of Image Forming System

Figure 1:
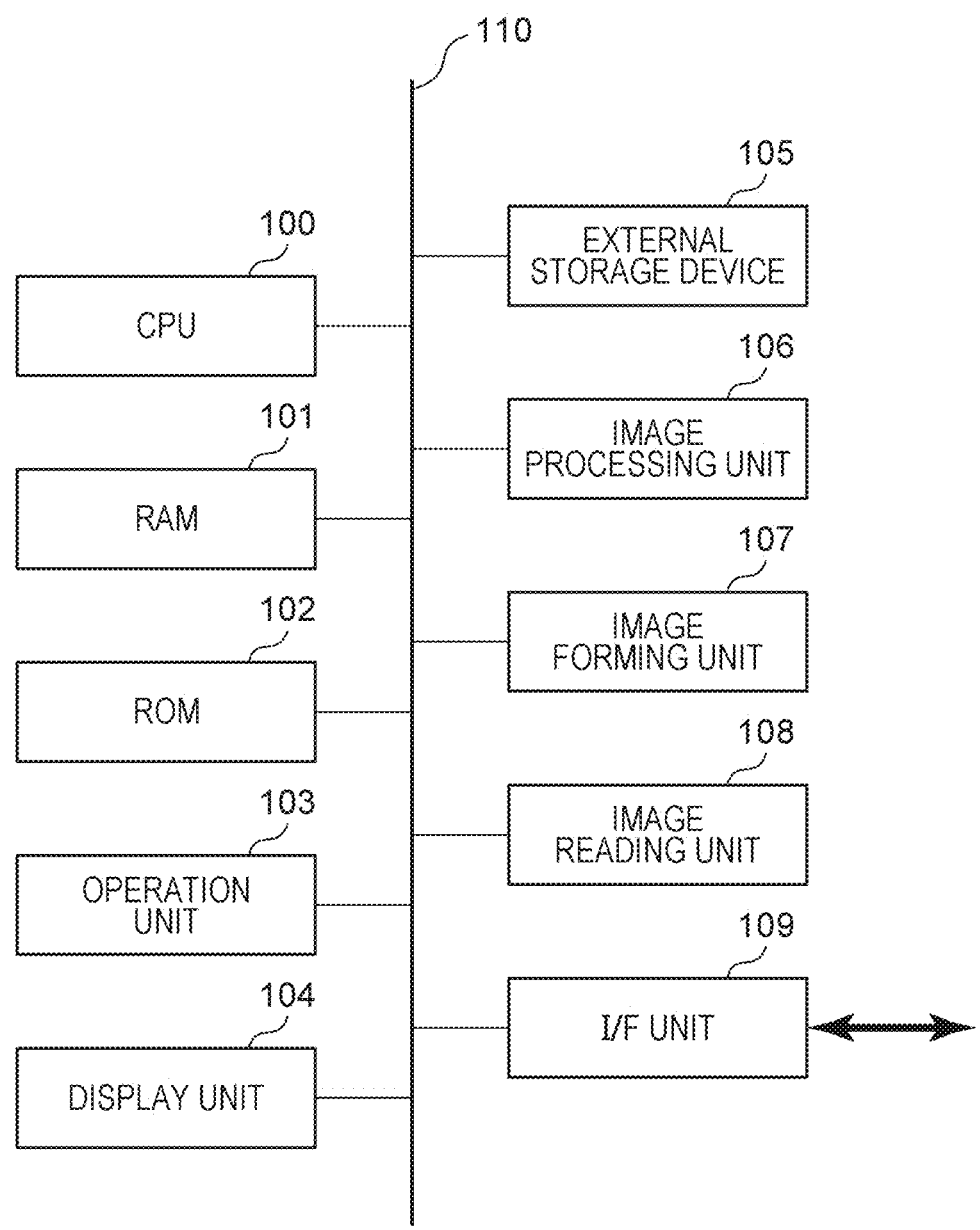
FIG. 1 is a diagram illustrating a hardware configuration of an image forming system.

FIG. 1 is a diagram illustrating a hardware configuration of an image forming system according to an embodiment of the present disclosure. The image forming system according to this embodiment includes a central processing unit (CPU) 100, a random access memory (RAM) 101, a read only memory (ROM) 102, an operation unit 103, a display unit 104, an external storage device 105, an image processing unit 106, an image forming unit 107, an image reading unit 108, an interface (I/F) unit 109, and a bus 110.

The CPU 100 controls the operation of the entire image forming system by using input data and a computer program stored in the RAM 101 and the ROM 102, which will be described below. Although a case where the CPU 100 controls the entire image forming system will be described as an example, the entire image forming system may be controlled by a plurality of pieces of hardware sharing processing.

The RAM 101 has a storage area for temporarily storing a computer program and data read from the external storage device 105 and data received from the outside via the I/F unit 109. The RAM 101 is used as a storage area when the CPU 100 executes various kinds of processing or when the image processing unit 106 executes image processing.

The ROM 102 has a storage area for storing setting parameters for setting each unit in the image forming system, a boot program, and the like.

The operation unit 103 is an input device, such as a keyboard or a mouse, and receives an operation (instruction) from an operator. That is, this allows the operator to input various instructions to the CPU 100.

The display unit 104 is a display device, such as a liquid crystal screen, and can display a processing result obtained by the CPU 100 with an image, characters, or the like. If the display unit 104 is a touch panel capable of detecting a touch operation, the display unit 104 may function as a part of the operation unit 103.

The external storage device 105 is a large-capacity information storage device represented by a hard disk drive. The external storage device 105 stores a computer program, data, and the like for causing an operating system (OS) or the CPU 100 to execute various kinds of processing. The external storage device 105 also holds temporary data (for example, image data that is input or to be output, a threshold matrix used by the image processing unit 106, and the like) generated by the processing of each unit. The computer program and data stored in the external storage device 105 are read as appropriate under the control of the CPU 100, stored in the RAM 101, and processed by the CPU 100.

The image processing unit 106 is implemented as a processor capable of executing a computer program or a dedicated image processing circuit, and executes various kinds of image processing for converting image data that is input as a print target into image data that can be output by an image forming apparatus to be described later. Note that instead of preparing a dedicated processor as the image processing unit 106, the CPU 100 may execute various kinds of image processing as the image processing unit 106.

The image forming unit 107 forms an image on a print medium, which is a recording medium, using a recording material, based on the image data received directly from the image processing unit 106 or via the RAM 101 or the external storage device 105.

The image reading unit 108 is an image sensor (line sensor or area sensor) for capturing a recorded image formed on the recording medium by the image forming unit 107.

The I/F unit 109 functions as an interface for connecting the image forming system to an external device. The I/F unit 109 also functions as an interface for exchanging data with a communication apparatus by using infrared communication, a wireless local area network (LAN), or the like, and an interface for connecting to the Internet. Thus, data such as an input image can be exchanged with the external device.

All of the above-described units are connected to the bus 110, and can exchange data via the bus 110. However, the image forming system may have a configuration in which the above-described units (for example, the image forming unit 107) are connected via the I/F unit 109.

Hardware Configuration of Image Forming Unit and Image Acquiring Unit

FIGS. 2A to 2D schematically illustrate the image forming unit 107 according to an embodiment of the present disclosure. The image forming unit 107 according to this embodiment is an ink-jet (IJ) printer, which forms an image by discharging ink from nozzles onto a recording medium.

Figure 2A:
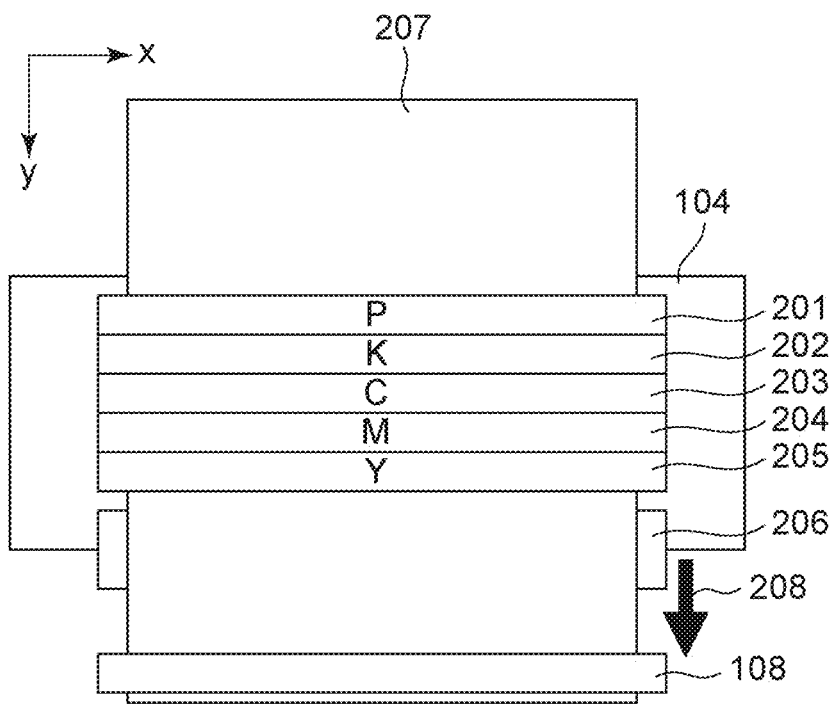
FIGS. 2A to 2D are schematic diagrams of an image forming unit.

As illustrated in FIG. 2A, the image forming unit 107 includes a plurality of recording heads 202 to 205 corresponding to a plurality of types of recording materials of black (K), cyan (C), magenta (M), and yellow (Y), respectively. In addition, a recording head 201 that discharges a primer (P) for fixing the ink on a recording medium 207 is provided. The primer is a colorless and transparent liquid.

Figure 2B:
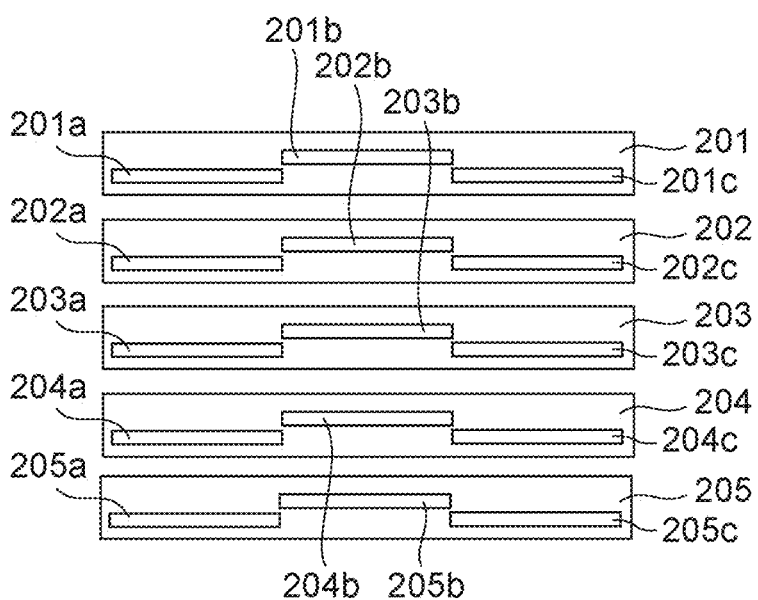

As illustrated in FIG. 2B, the recording heads 201 to 205 are configured by combining a plurality of head modules. Head modules 201a, 201b, and 201c constituting the recording head 201 are alternately arranged in the paper conveyance direction.

Figure 2C:
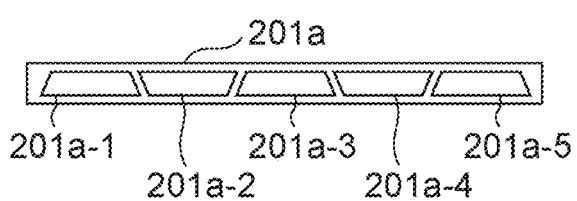

Furthermore, as illustrated in FIG. 2C, the head module 201a is constituted by a plurality of chip modules 201a-1 to 201a-5. At this time, it is assumed that each chip module is connected to an independent board.

Figure 2D:
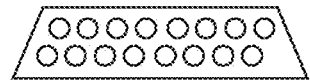

FIG. 2D is a plan view of one of the chip modules, illustrating that the chip module has a plurality of nozzles. In the example illustrated in FIG. 2D, the chip module has 16 nozzles. The resolution of the nozzle arrangement is 1200 dpi.

The recording medium 207 is conveyed in a direction indicated by an arrow 208 in FIG. 2A by rotating a guide roller 206 (and other rollers (not illustrated)) by a driving force of a motor (not illustrated). Subsequently, while the recording medium 207 is conveyed, the ink and the primer are discharged from the plurality of nozzles of each of the recording heads 201 to 205 in accordance with recording data, and thereby an image for one raster corresponding to the nozzle array of each recording head is sequentially formed. In this manner, for example, an image for one page can be recorded by repeating the discharge operation from each recording head with respect to the conveyed recording medium.

As illustrated in FIG. 2A, the image reading unit 108 is a line sensor that covers the entire surface of the recording medium and is disposed downstream of the recording heads 201 to 205. That is, after an image is formed by the recording heads 201 to 205, the recording medium 207 is conveyed to the image reading unit 108. The image reading unit 108 sequentially captures images of the conveyed recording medium, acquires, for example, RGB information or luminance information, and stores the information in the external storage device 105 as two dimensional image data.

Functional Configuration of Image Processing Unit

Figure 3:
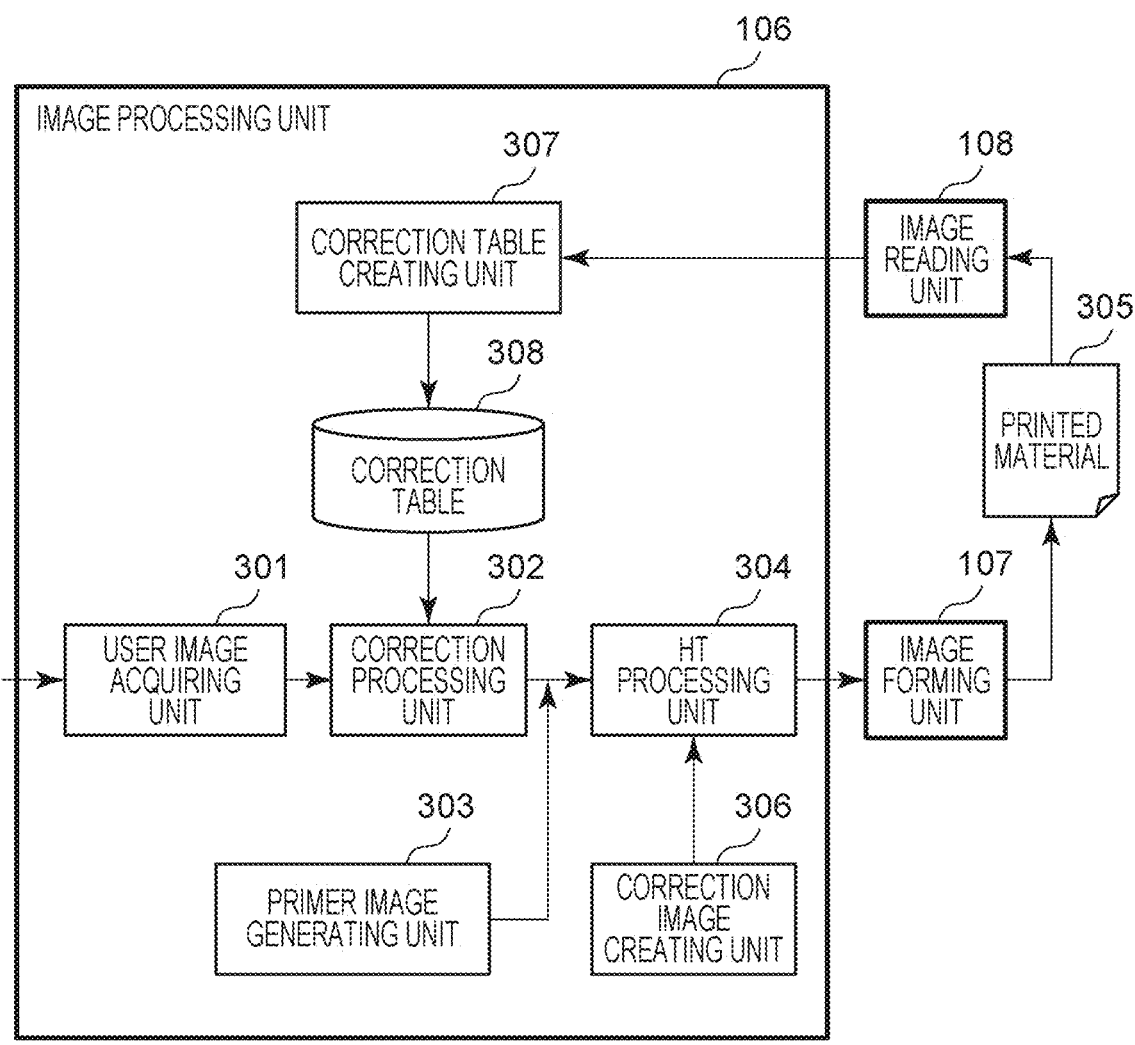
FIG. 3 is a configuration diagram of an image processing unit.

Now, the configuration of the image processing unit 106 will be described below with reference to FIG. 3.

A user image acquiring unit 301 acquires a given input image designated by a user. In this embodiment, the input image is 8-bit CMYK image data.

A correction processing unit 302 corrects the input image by head shading (HS) processing. The HS processing herein is processing for correcting density unevenness caused by variations in the discharge amount of each nozzle included in the recording heads 202 to 205. Details of the HS processing will be described later.

A primer image generating unit 303 generates a primer image. The primer image herein is an image representing the amount of primer to be applied to each position on the recording medium. In this embodiment, a uniform image having the same size as the recordable size is used as the primer image. That is, the primer amount is constant regardless of the position on the recording medium. Note that the primer amount can be determined in advance from the relationship with the image quality, and it is preferable to use different amounts for each sheet type (coated paper or non-coated paper). Hereinafter, the predetermined primer amount is referred to as a reference primer amount.

A halftone (HT) processing unit 304 performs quantization processing on the input image and the primer image. In this embodiment, 1-bit binary data for five planes of CMYK+P is generated. As a quantization processing method, a dither method is used in this embodiment, but other pseudo-halftone processing, such as an error diffusion method, may be used.

The image forming unit 107 drives the recording head, based on dot data obtained by the quantization, and performs recording by discharging the ink of each color and the primer onto the recording medium. Upon completion of image formation, a printed material 305 is obtained.

HS Processing

Now, the HS processing will be described below with reference to FIG. 4, FIGS. 5A and 5B, and FIGS. 6A and 6B.

FIG. 4 is a flowchart of the HS processing. The HS processing is executed independently for each color of ink. Hereinafter, description will be given using an example of K ink.

Figure 5A:
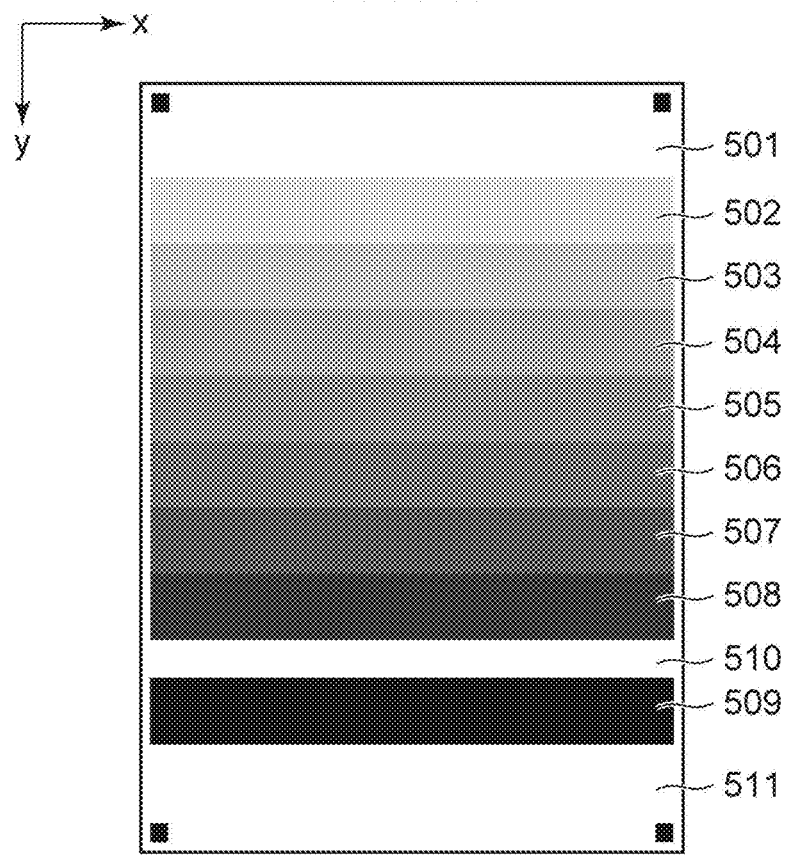
FIGS. 5A and 5B are diagrams illustrating an example of an HS correction image in a first embodiment.

First, in step S401, a correction image creating unit 306 creates a correction image. FIG. 5A illustrates an example of the correction image in this embodiment.

Square markers for specifying the positions of measurement regions 501 to 509 are arranged at the four corners of the correction image. The relative positional relationship between the markers at the four corners and the measurement regions is held as chart information.

Figure 5B:
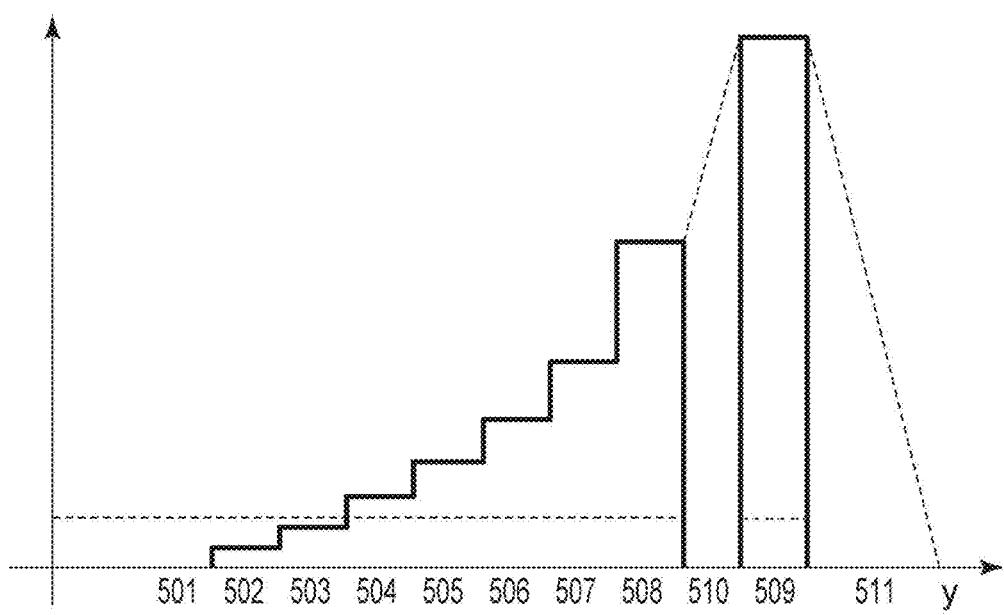

The measurement regions 501 to 509 have K signal values that are stepwise different from each other, but have the same primer signal value. In addition, the K signal value in each measurement region is uniform. Non-measurement regions 510 and 511 are arranged above and below the measurement region 509. The K signal value in the non-measurement regions is zero, but the primer signal value therein is a value determined by a method described later. FIG. 5B is a graph illustrating an average ink amount for each position in a y direction of the correction image illustrated in FIG. 5A. The solid line corresponds to a K ink amount, and the broken line corresponds to the primer amount.

A method for creating the correction image will be described later.

Subsequently, in step S402, the created correction image is printed. More specifically, the HT processing unit 304 quantizes the correction image, and the image forming unit 107 records the image on a recording medium. Upon completion of image formation, the printed material 305 is obtained.

In step S403, the image reading unit 108 captures an image of the printed material 305 to acquire a read image. In this embodiment, the read image is an 8-bit 1200 dpi luminance image.

In step S404, measurement regions are specified from the read image. In this embodiment, marker positions at the four corners are detected, and the positions of the measurement regions 501 to 509 are specified from the relative positional relationship with the markers held in the chart information.

In step S405, a measurement curve is acquired from pixel values in the measurement regions on the read image. The measurement curve herein represents a density characteristic of a nozzle corresponding to a pixel position x, and curves corresponding to the number of nozzles used when a measurement image is recorded are obtained.

Figure 6A:
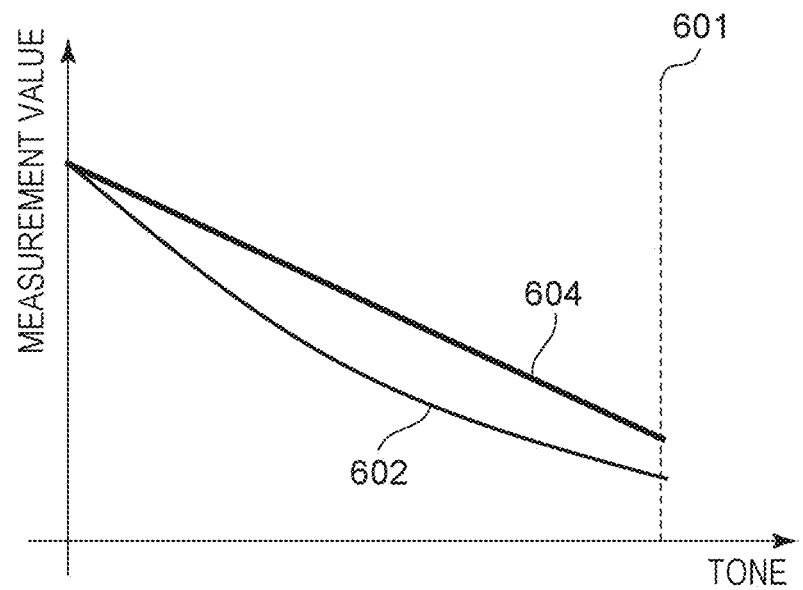
FIGS. 6A and 6B are schematic diagrams for describing the HS processing.

FIG. 6A illustrates an example of the acquired measurement curve. The horizontal axis of FIG. 6A is the signal value of each of the measurement regions 501 to 509 of the correction image, and the vertical axis is the signal value of the read image. A broken line 601 indicates an upper limit value on the horizontal axis, which is 255, the upper limit value of 8 bits in this embodiment. A measurement curve 602 is a measurement curve obtained by interpolation calculation from the read signal values of each of the measurement regions 501 to 509. In this embodiment, piecewise linear interpolation is used as the interpolation method. Any interpolation method may be used, and a known spline curve or the like may be used.

Subsequently, in step S406, a target characteristic 604 is acquired. In this embodiment, as illustrated in FIG. 6A, measurement values that are linear with respect to the tone are set as the target characteristic. Note that the target characteristic is common to all the nozzles. By performing correction so that all the nozzles have the same target characteristic, it is possible to reduce density unevenness caused by characteristic variations of each nozzle.

Figure 6B:
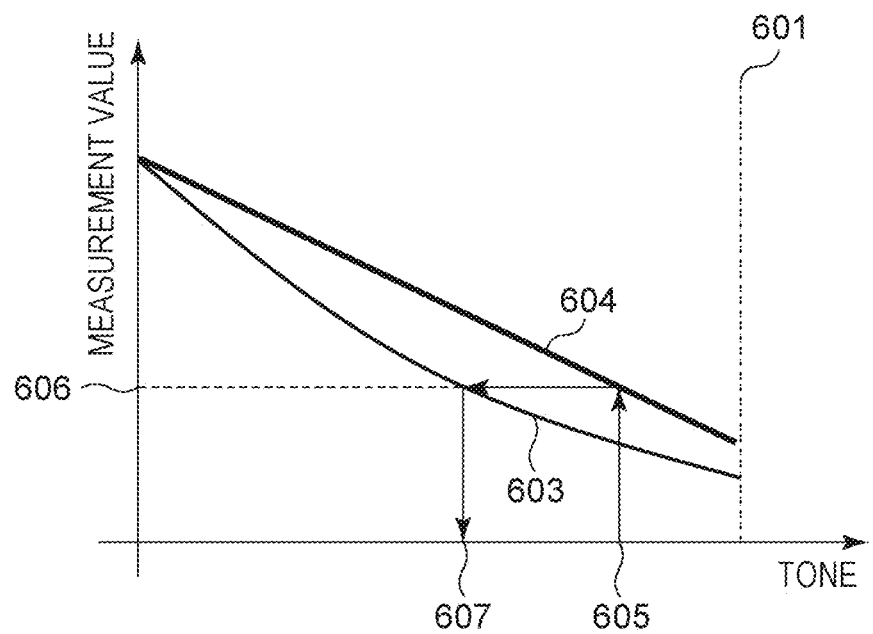

Subsequently, in step S407, a corrected input value is acquired. Acquisition of the corrected input value will be described with reference to FIG. 6B. In FIG. 6B, reference numeral 605 denotes an input value corresponding to a pixel value of a given user image. At this time, the value of the target characteristic 604 corresponding to the input value 605 is acquired and set as a target value 606. Furthermore, the tonal value corresponding to the target value 606 is acquired from a corrected measurement curve 603, and a corrected input value 607 is acquired.

In this embodiment, the signal values in the measurement regions 501 to 509 of the correction image are set as input values, and the correspondence with the corrected input values is stored in a correction table 308. At the time of correction by the correction processing unit 302, with reference to the correction table 308, the corrected input value corresponding to the input value of the user image is acquired for each pixel.

As described above, the HS processing using the correction table created from the correction image can reduce the density unevenness caused by characteristic variations of each nozzle.

Creation of Correction Image

Now, the processing performed by the correction image creating unit 306 will be described below with reference to FIG. 7. FIG. 7 is a flowchart for creating the correction image. The correction image is created independently for each color of ink. Hereinafter, description will be given using an example of K ink.

First, in step S701, patch parameters are acquired. The patch parameters in this embodiment are the number of patches, the patch height, and ink amounts of the patches. In the following description, it is assumed that the number of patches is nine, the patch height is 30 mm, and the ink amounts of the patches are 0, 8, 20, 35, 50, 70, 100, 160, and 255 as 8-bit signal values.

Subsequently, in step S702, a constraint parameter is acquired. The constraint parameter herein is an upper limit value of the gradient of moisture amount. The gradient of moisture amount is defined as a value obtained by dividing the moisture amount difference between two regions on the paper surface by the distance between the regions. In this embodiment, for the sake of simplicity, a difference between ink amounts (8-bit signal values) is used as an alternative value of the moisture amount difference. The upper limit value can be determined in advance by an experiment. In this embodiment, an example in which the signal value difference per 30 mm is 60 or less, that is, the upper limit of the gradient is 60/30=2 will be described.

The subsequent processing is executed for all adjacent patch pairs. That is, the processing is sequentially executed on adjacent patch pairs, such as (0,8), (8,20), and (20,35). After the processing is executed on the pair (160,255), the processing is also executed on the pair (255,0) in consideration of the white background of the sheet end.

In step S703, it is determined whether an adjacent patch pair satisfies a constraint. For example, in the pair (0,8), the moisture amount difference (signal value difference) is 8−0=8. The distance between the center positions of the patches is used as a patch interval, and is set to 30 mm, which is the same as the patch height. At this time, since the gradient is 8/30=0.27 and is not more than the upper limit, which is 2, it is determined that the constraint is satisfied.

If the constraint is satisfied, the process advances to step S704 to arrange patches on the correction image.

For example, in the pair (0,8), a patch having an ink amount of 0 and a height of 30 mm and a patch having an ink amount of 8 and a height of 30 mm are arranged adjacent to each other, and are arranged as in the measurement region 501 and the measurement region 502 in FIG. 5A. The primer amount at this time is the reference primer amount determined in advance from the relationship with the image quality. In this embodiment, an example in which the reference primer amount is set to 30 as an 8-bit signal value will be described.

On the other hand, if the constraint is not satisfied, the process advances to step S705. For example, in the pair (160,255), the moisture amount difference (signal value difference) is 255−160=95, the patch interval is 30 mm, and the gradient is 95/30=3.17, exceeding the upper limit, which is 2. Thus, it is determined that the constraint is not satisfied.

In step S705, for the patch pair that does not satisfy the constraint, the patch interval is calculated. The patch interval may be greater than or equal to a value obtained by dividing the moisture amount difference by the gradient upper limit. Therefore, in the case of (160,255), the patch interval may be greater than or equal to (255−160)/2=47.5. At this time, a necessary interval can be calculated as 47.5−30=17.5 mm, by subtracting the original patch interval, which is 30 mm.

Subsequently, in step S706, the primer amount between the separated patches is calculated. In this embodiment, the K signal value between the separated patches is calculated by linear interpolation. In the case of (160,255), the primer amount between the patches changes linearly from 160 to 255. Even if it is not linear, it is preferable that no inflection point be included.

When step S706 ends, the process advances to step S704 to arrange patches on the correction image. In the pair (160,255), a patch having an ink amount of 160 and a height of 30 mm and a patch having an ink amount of 255 and a height of 30 mm are arranged with an interval of 17.5 mm, as in the measurement region 508 and the measurement region 509 in FIG. 5A. In other words, the amount of color material, which is the amount of recording material constituting each patch, is determined so that the change in the amount of color material constituting the patch is small between patches.

In addition, the non-measurement region 510 having a height of 17.5 mm is arranged between the measurement region 508 and the measurement region 509.

The non-measurement region 511 is also arranged below the measurement region 509. The height of the non-measurement region 511 is calculated in step S705 as (255−0)/2−30=97.5 mm.

The correction image is created through the steps described above. FIG. 5A illustrates an example of the correction image in this embodiment. FIG. 5B is a graph illustrating an average ink amount for each position in the y direction of the correction image illustrated in FIG. 5A. The solid line corresponds to the K ink amount, and the broken line corresponds to the primer amount.

Effects

The image capable of suppressing the sheet deformation caused by the moisture amount difference has been described above as the correction image for acquiring the characteristic used for the HS processing. According to this embodiment, it is possible to appropriately acquire the discharge amount difference for each nozzle, and it is possible to improve the correction accuracy.

Figure 8B:
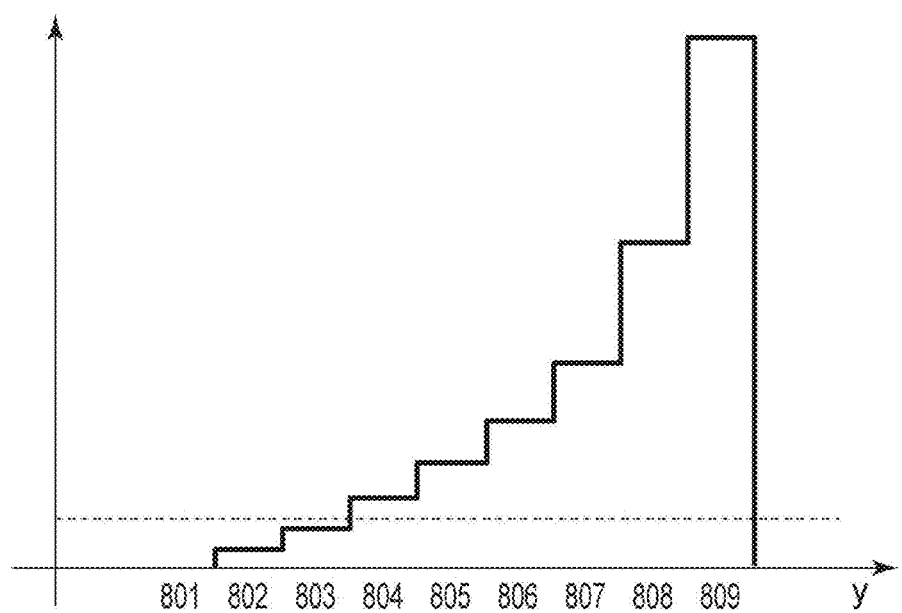

In order to clarify a difference from the related art herein, an example of a correction image used in HS processing in the related art is illustrated in FIGS. 8A and 8B. If the primer amount in the measurement region 808 is increased in order to reduce the moisture amount difference between the measurement regions 808 and 809 in this image, the color reproduction changes, and it is not possible to acquire correct characteristic in some cases. More specifically, since the measurement curve 602 in FIG. 6A becomes a curve different from that when the user image is printed, the correction accuracy may be reduced.

On the other hand, in this embodiment, since the primer amount of the measurement region is not changed and the non-measurement region is provided to suppress the sheet deformation, it is possible to prevent the reduction of the correction accuracy.

Modification

Although an example in which the colorless and transparent primer liquid is applied to the non-measurement region has been described, any method for applying moisture may be used. For example, any of the CMYK inks may be applied to the non-measurement region. In addition, the present disclosure can be applied to an example in which clear ink for gloss adjustment or white ink is used instead of the primer liquid. In addition, although an example in which the CMYK inks are used as the color inks has been described, the present disclosure can also be applied to a printer including particular color inks such as red and green, and light color inks such as light cyan, light magenta, and gray.

In addition, although an example in which the markers at the four corners are used when the measurement regions are specified in step S404 has been described, any specifying method may be used. For example, the measurement regions can also be specified by averaging the scanned image in the x-axis direction and detecting edge positions from the data stream as illustrated in FIG. 5B.

In addition, although an example in which the interval is calculated in step S705 has been described, a predetermined distance which is set in advance and is sufficiently large may be applied as the interval.

In addition, although an example in which the primer amount in the non-measurement region is calculated in step S706 by the linear interpolation of the signal values of the separated patches has been described, any condition may be satisfied as long as the local moisture amount difference can be sufficiently reduced. For example, the average value of the signal values of the separated patches may be used as long as it does not exceed the upper limit of the gradient of moisture amount. To generalize the condition, in a case where a patch having the smaller moisture amount between the separated patches is referred to as a patch A and a patch having the larger moisture amount is referred to as a patch B, the following relationship may be satisfied: the moisture amount in the patch A<the moisture amount in the non-measurement region<the moisture amount in the patch B.

In addition, since the degree of sheet deformation varies depending on the type of ink or sheet used and the printing speed, it is preferable that the upper limit of the gradient of moisture amount be determined for each of these conditions.

In the above description, the moisture amount difference is replaced with the ink amount difference. However, since the moisture amount may vary depending on the ink type, it is preferable to use a value obtained by multiplying the ink amount by a moisture amount ratio. In this case, since the permeation speed may vary depending on the ink type, a value obtained by multiplying the permeation speed by a correction coefficient may be used.

Second Embodiment

In the first embodiment, an example of the HS correction image has been described in which only the patches having a large moisture amount difference are arranged to be separated from each other and the other patches are arranged to be adjacent to each other. On the other hand, if the paper conveyance accuracy of a printing apparatus is insufficient, markers may be recorded between all the patches in order to accurately associate the read image with the nozzle positions. Therefore, in the second embodiment, an example in which the sheet deformation is suppressed in a case where the markers are recorded between all the patches will be described. Note that description of parts common to those in the first embodiment will be simplified or omitted.

Creation of Correction Image

Figure 9:
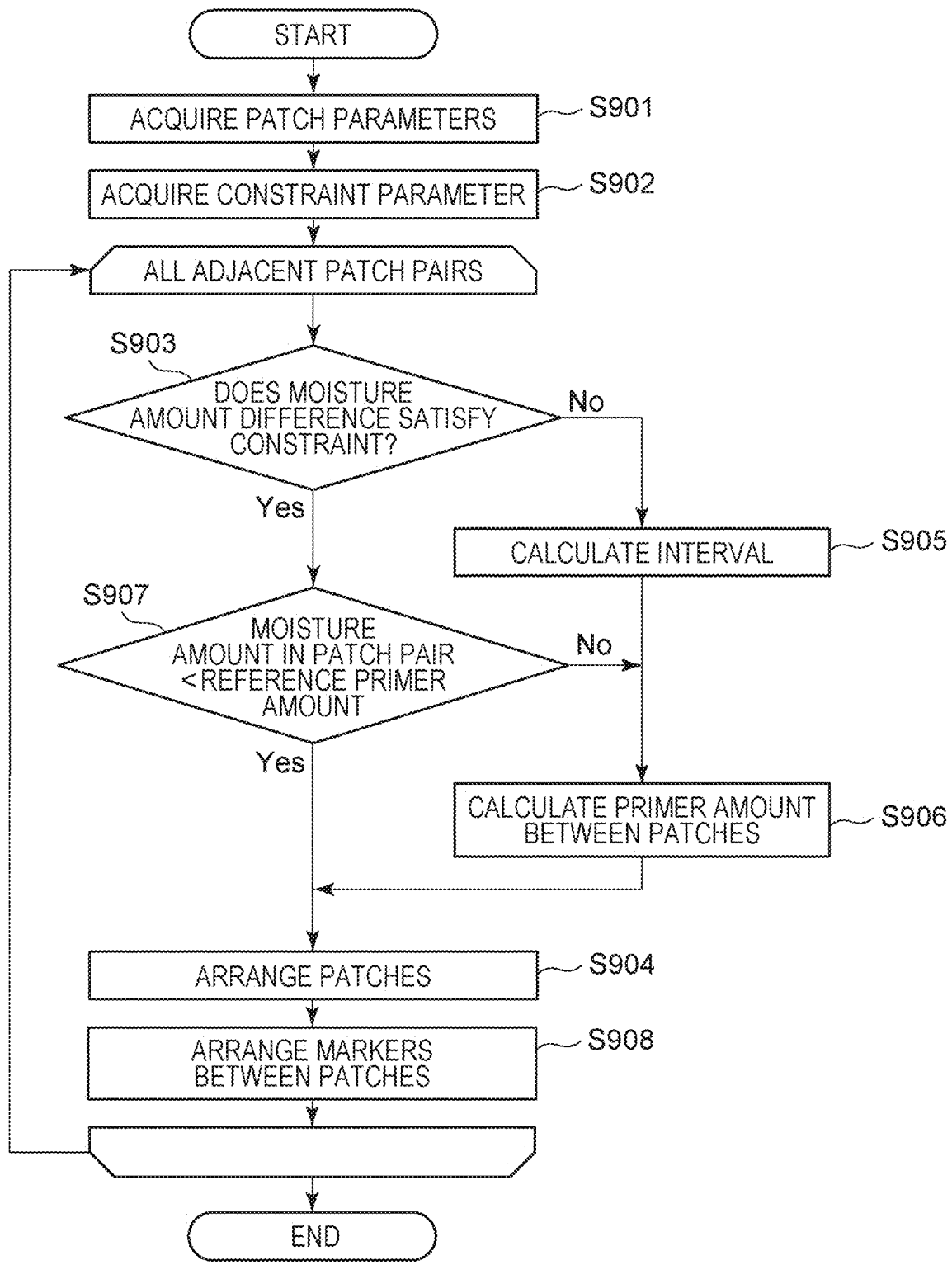
FIG. 9 is a flowchart for creating an HS correction image in a second embodiment.

Now, creation of the correction image in this embodiment will be described below with reference to FIG. 9 and FIGS. 10A and 10B. FIG. 9 is a flowchart for creating the correction image in this embodiment. The correction image is created independently for each color of ink. Hereinafter, description will be given using an example of K ink.

First, in step S901, patch parameters are acquired. As the patch parameters in this embodiment, in addition to the number of patches, the patch height, and ink amounts of the patches, a reference interval is acquired. The reference interval herein is a distance necessary for recording markers between all the patches. In the following description, the reference interval is set to 5 mm. As for the other parameters, as in the first embodiment, it is assumed that the number of patches is nine, the patch height is 30 mm, and the ink amounts of the patches are 0, 8, 20, 35, 50, 70, 100, 160, and 255 as 8-bit signal values. In addition, the reference primer amount is 30.

Subsequently, in step S902, a constraint parameter is acquired. The constraint parameter is an upper limit value of the gradient of moisture amount, and a difference between 8-bit signal values is used as an alternative value of the moisture amount difference. In this embodiment, the signal value difference per 30 mm is 60 or less, that is, the upper limit of the gradient is 60/30=2.

The subsequent processing is executed for all adjacent patch pairs.

In step S903, it is determined whether an adjacent patch pair satisfies a constraint. For example, in the pair (0,8), the moisture amount difference (signal value difference) is 8−0=8. A value obtained by adding the reference interval to the distance between the center positions of the patches is used as a patch interval, and is set to 30+5=35 mm.

At this time, since the gradient is 8/35=0.23 and is not more than the upper limit, which is 2, it is determined that the constraint is satisfied.

If the constraint in step S903 is satisfied, the process advances to step S907, and the moisture amount in the patch is compared with the reference primer amount. If the moisture amount in one or both of the patches in the patch pair is less than the reference primer amount, the process advances to step S904.

The flow in FIG. 9 branches into three ways depending on the determinations in step S903 and step S907. Each branch will be described below.

(1) Example of Case where Both Determinations in S903 and S907 are Satisfied: Patch Pair (0,8)

In step S904, patches are arranged on the correction image. In this case, the reference primer amount is used as the primer amount.

Subsequently, in step S908, markers are arranged between the patches. The type of ink used for recording the markers is the same as the type of ink used in a recording region. In this embodiment, straight line markers in the y direction are used. The number of markers is nine, and the markers are arranged so as to equally divide the patch into eight in the x direction.

Figure 10A:
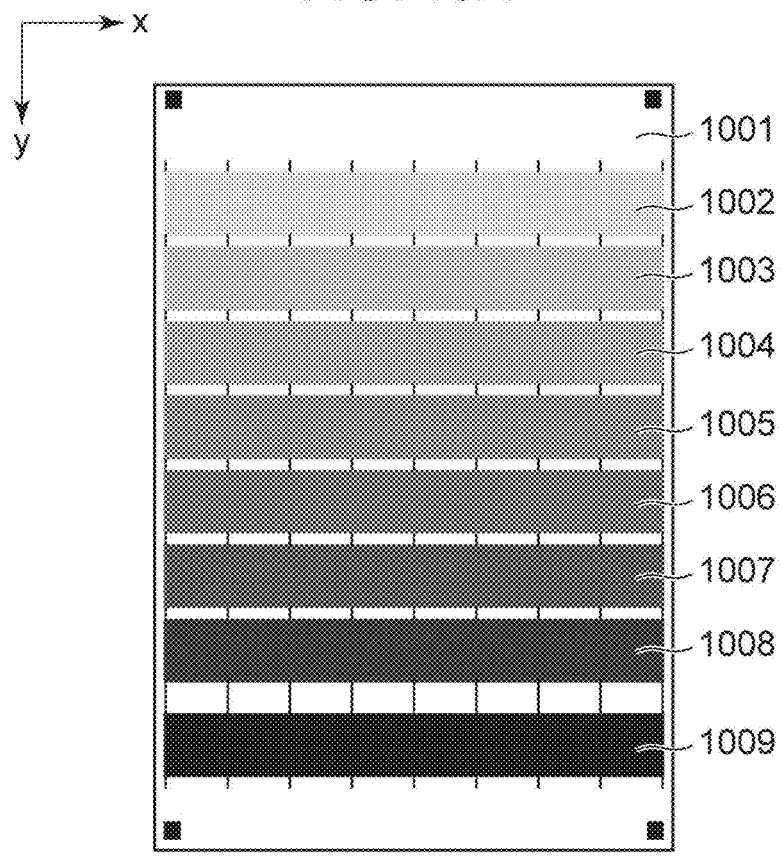
FIGS. 10A and 10B are diagrams illustrating an example of the HS correction image in the second embodiment.

For example, in the patch pair (0,8), as illustrated in FIG. 10A, the markers are arranged between recording regions 1001 and 1002. In this case, the reference primer amount is used as the primer amount.

(2) Example of Case where S903 is Satisfied but S907 is not Satisfied: Patch Pair (35,50)

If it is determined in step S907 that both of the moisture amounts in the patch pair are greater than or equal to the reference primer amount, the process advances to step S906. For example, in the patch pair (35,50), it is determined that both of the moisture amounts are greater than the reference primer amount (30).

In step S906, the primer amount between the separated patches is calculated. For example, in the patch pair (35,50), the primer amount between the patches changes linearly from 35 to 50. After step S906, step S904 and step S908 are executed.

Figure 10B:
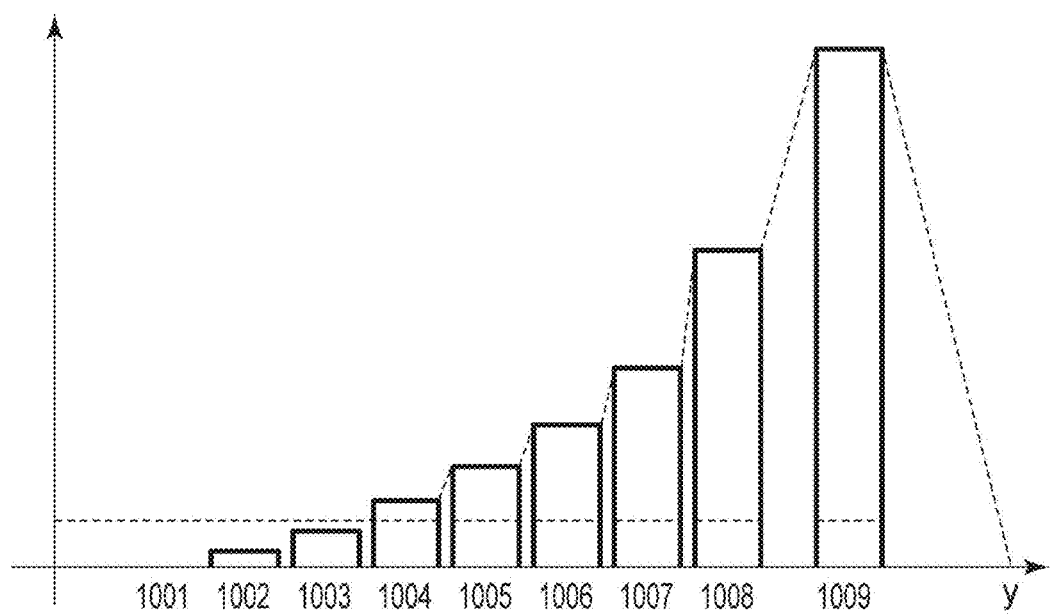

As indicated by the broken line in FIG. 10B, the primer amount increases linearly between measurement regions 1004 and 1005.

(3) Example of Case where S903 is not Satisfied: Patch Pair (160,255)

If it is determined in step S903 that the constraint is not satisfied, the process advances to step S905. For example, in the pair (160,255), the moisture amount difference (signal value difference) is 255−160=95, the patch interval is 35 mm obtained by adding the reference interval 5 mm to the patch height 30 mm, and the gradient at this time is 95/35=2.71. Since the upper limit, which is 2, is exceeded, it is determined that the constraint is not satisfied.

In step S905, the interval of the patch pair that does not satisfy the constraint is calculated. In the case of (160,255), the interval may be greater than or equal to (255−160)/2=47.5. That is, a necessary interval is 47.5−30=17.5 mm.

Step S905 is followed by step S906, step S904, and step S908. As illustrated in FIGS. 10A and 10B, measurement regions 1008 and 1009 are separated from each other by 17.5 mm, and the primer amount increases linearly.

The correction image in this embodiment is created through the steps described above.

Effects

According to this embodiment, it is possible to suppress the sheet deformation in a case where the markers are recorded between all the patches as the correction image for acquiring the characteristic used for the HS processing, and it is possible to improve the correction accuracy.

Modification

Although an example in which the straight line is used as the marker between the patches has been described, any marker may be used. The marker may have a shape other than a straight line, and any interval between the markers or any height can be applied.

In addition, when the primer amount between the patches is calculated in step S906, the primer amount may be calculated in consideration of the moisture amount of the ink used for the markers.

In addition, although an example in which the primer amount between the patches calculated in step S906 is recorded on the entire surface between the patches has been described, the reference primer amount may be used for only the marker portion and the vicinity thereof. As a result, it is possible to reduce the moisture amount difference while suppressing recording defects of the markers.

Third Embodiment

In the first embodiment, an example of the HS correction image in which the patches are arranged in ascending order of the ink amount has been described. However, the patches may be arranged in any order. In the correction image as illustrated in FIG. 5A, since the patch having the largest amount of ink is arranged at the lower end of the sheet, a wide space is required to reduce the moisture amount difference from the white background portion.

In the third embodiment, an example will be described in which the patches are arranged in an order in consideration of the moisture amount difference at the end portion of the sheet by arranging a high-density patch at the center of all the patches. That is, this is an example in which the patches are arranged in an order in which regions other than the region having the largest moisture amount are arranged at the end portion of the image.

Creation of Correction Image

Now, creation of the correction image in this embodiment will be described below with reference to FIG. 7 and FIGS. 11A and 11B.

FIG. 7 is a flowchart for creating the correction image.

The difference from the first embodiment is only the patch parameters in step S701. In this embodiment, the ink amounts of the respective patches are set in the order of 0, 8, 35, 70, 160, 255, 100, 50, and 20 as 8-bit signal values. These ink amounts correspond to measurement regions 1101 to 1109 in FIGS. 11A and 11B.

At this time, cases where it is determined in step S703 that the constraint is not satisfied are (70,160), (160,255), and (255,100). The interval for (70,160) is (160−70)/2−30=15 (a non-measurement region 1110). The interval for (160,255) is (255−160)/2−30=17.5 (a non-measurement region 1111). The interval for (255,100) is (255−100)/2−30=47.5 (a non-measurement region 1112).

Figure 11A:
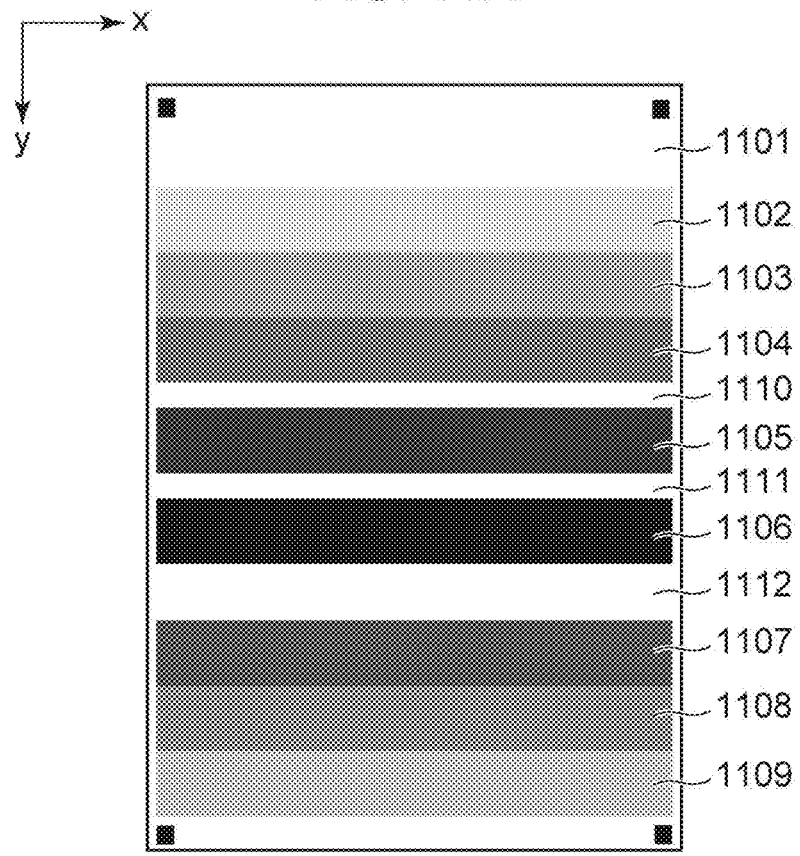
FIGS. 11A and 11B are diagrams illustrating an example of an HS correction image in a third embodiment.
Figure 11B:
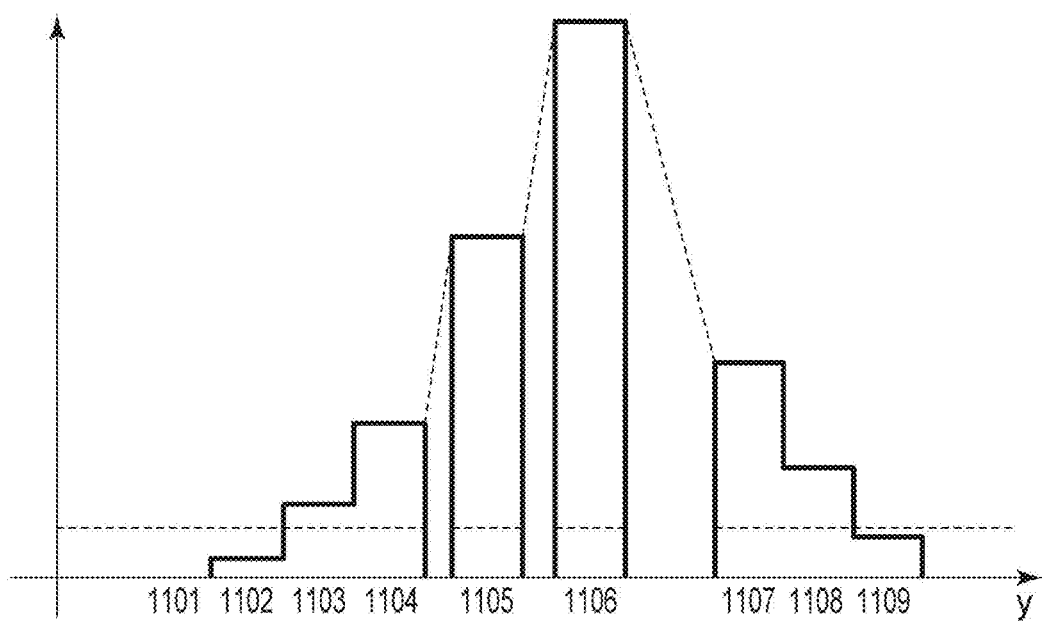

FIGS. 11A and 11B illustrate the correction image created in this embodiment. As compared with the example in the first embodiment illustrated in FIGS. 5A and 5B, the non-measurement region is reduced to 15+17.5+47.5=80 mm in FIG. 11A, while 17.5+97.5=115 mm is required in FIG. 5A.

Effects

According to this embodiment, it is possible to suppress the sheet deformation while preventing enlargement of the correction image for acquiring the characteristic used for the HS processing, and it is possible to improve the correction accuracy.

Fourth Embodiment

In the first embodiment, an example of suppressing the sheet deformation of the correction image used for the HS processing has been described. In the fourth embodiment, an example of suppressing the sheet deformation of the correction image used for color correction processing will be described.

Functional Configuration of Image Processing Unit

Now, the configuration of the image processing unit 106 in this embodiment will be described below with reference to FIG. 3.

The user image acquiring unit 301 acquires a given input image designated by a user.

The correction processing unit 302 performs color correction processing on the input image. The color correction processing is processing for calibrating the color characteristic of the apparatus by using a CMYK-to-CMYK color conversion table. In this embodiment, the correction table 308 is a color conversion table, and is a CMYK-to-CMYK lookup table (LUT).

The primer image generating unit 303 generates a primer image. The halftone (HT) processing unit 304 performs quantization processing on the input image and the primer image. The image forming unit 107 drives the recording head, based on dot data obtained by the quantization, and performs recording by discharging the ink of each color and the primer onto the recording medium. Upon completion of image formation, the printed material 305 is obtained.

Color Correction Processing

Figure 13A:
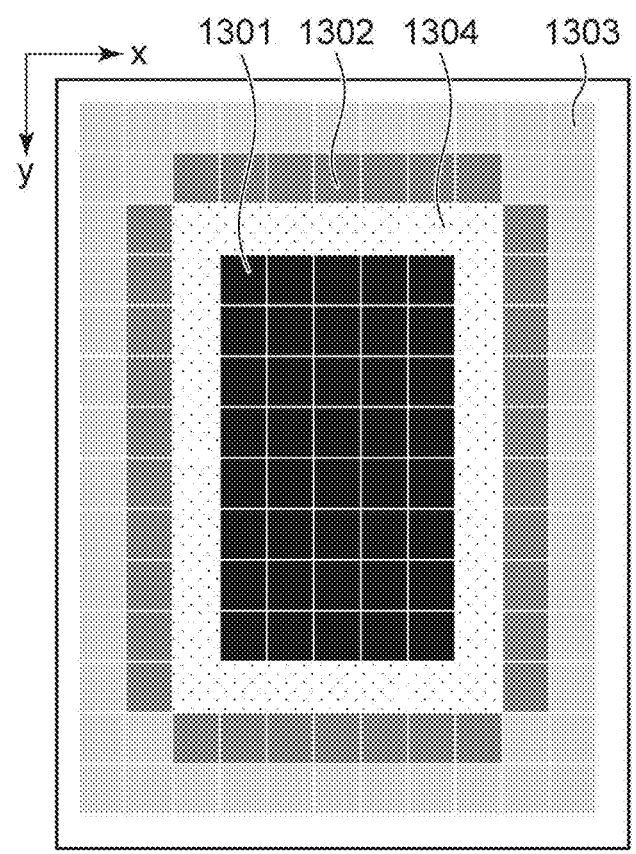
FIGS. 13A and 13B are diagrams illustrating examples of the color correction image in the fourth embodiment.
Figure 13B:
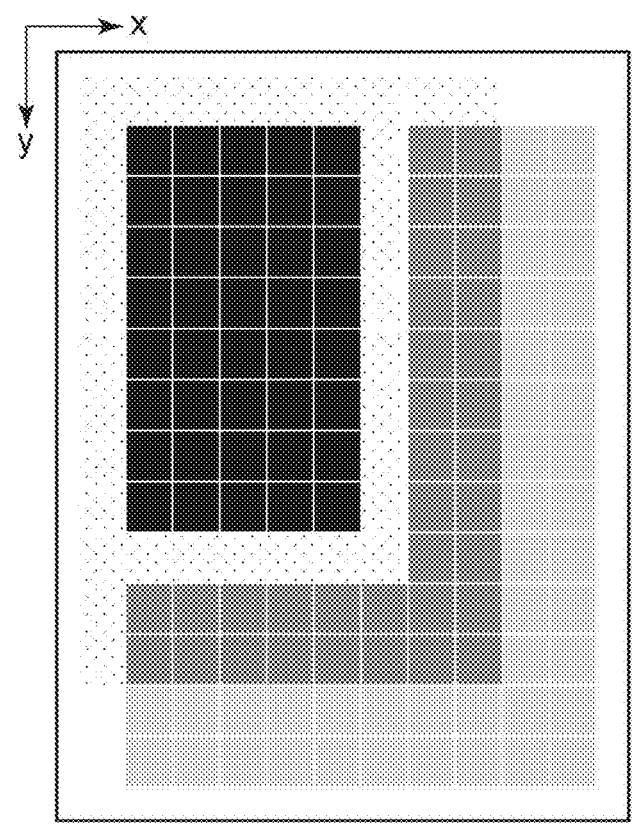

The correction image creating unit 306 creates the correction image for creating the correction table 308. FIGS. 13A and 13B illustrate an example of the correction image in this embodiment. The processing for creating the correction image will be described later.

The image reading unit 108 in this embodiment is a colorimeter, and acquires a Lab value for each measurement region of the printed material 305.

A correction table creating unit 307 calculates a CMYK value to be a predetermined target Lab value from the relationship between the CMYK signal of the correction image and the measured Lab value. In this embodiment, a corrected CMYK value is calculated by referring to CMYK value corresponding to a desired Lab value from a CMYK-to-Lab four dimensional LUT. The correspondence between CMYK before correction and CMYK after correction is stored in the correction table 308.

The correction processing unit 302 corrects the CMYK value of the user image with reference to the correction table 308.

Creation of Correction Image

Now, processing for creating the correction image in this embodiment will be described below with reference to FIG. 12 and FIGS. 13A and 13B.

Figure 12:
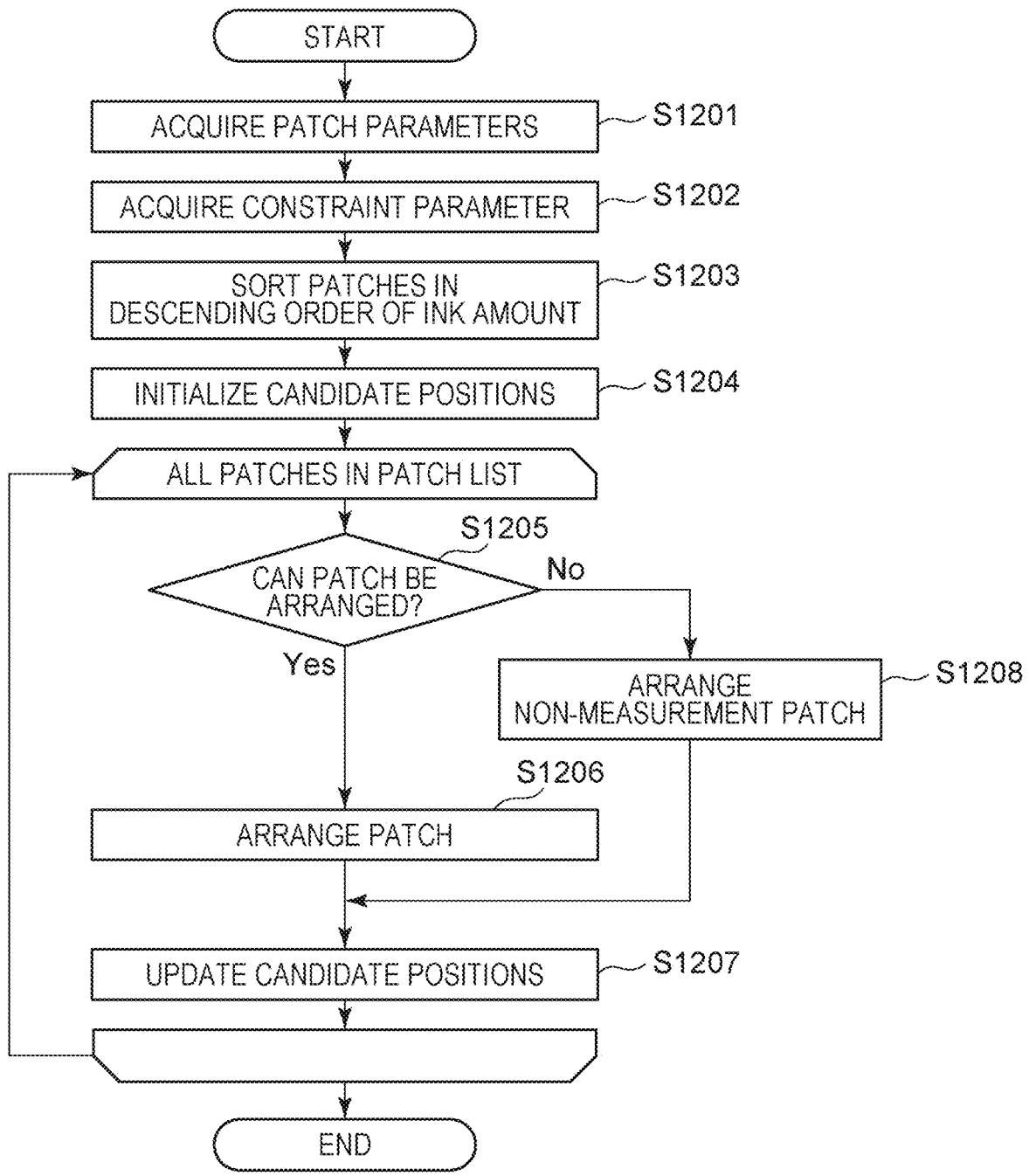
FIG. 12 is a flowchart for creating a color correction image in a fourth embodiment.

FIG. 12 is a flowchart for creating the correction image in this embodiment.

First, in step S1201, patch parameters are acquired. The patch parameters in this embodiment are the number of patches, the patch height, the patch width, and CMYK values of the patches.

Subsequently, in step S1202, a constraint parameter is acquired. The constraint parameter herein is an upper limit value of the gradient of moisture amount.

Subsequently, in step S1203, the patches are sorted in descending order of ink amount to create a patch list. In this embodiment, the total value of the CMYK 8-bit signal values is used as the ink amount.

Subsequently, in step S1204, candidate positions at which patches can be arranged are initialized. In this embodiment, initialization is performed at the center position of the image.

The subsequent processing is sequentially executed for all the patches in the patch list.

In step S1205, it is determined whether a patch of interest can be arranged at a candidate position. In this embodiment, it is determined whether the moisture amount gradient obtained if the patch of interest is arranged at the candidate position is less than or equal to the upper limit. The moisture amount gradient is calculated as $\nabla W$ in the following equation, where the moisture amount in the patch of interest is W0, the moisture amount in each adjacent patch is Wi, and the patch interval is di.

$$\nabla W = \max(|W0 - Wi|/di)$$

In this embodiment, a maximum of four patches adjacent to each other in the vertical and horizontal directions are used as the adjacent patches. The adjacent patches also include non-measurement patches to be described later. Since there is no adjacent patch when an initial patch is arranged, it is unconditionally determined that the initial patch can be arranged.

If it is determined that a patch can be arranged at any of the candidate positions, the process advances to step S1206. In step S1206, the patch of interest is arranged at the candidate position. The arranged patch is deleted from the patch list.

Subsequently, in step S1207, the position where the patch (or the non-measurement patch) is arranged is deleted from the candidate positions.

In step S1208, among adjacent positions, a position where no patch (or non-measurement patch) is arranged is added to the candidate positions.

On the other hand, if it is determined in step S1205 that it is not possible to arrange the patch at any candidate position, the process advances to step S1208. In step S1208, the non-measurement patch is arranged at the candidate position. In this embodiment, the non-measurement patch is arranged at the candidate position where the moisture amount at the adjacent position is the largest. As the non-measurement patch, a patch of only the primer is used in an amount as small as possible within a range satisfying the constraint of the moisture amount gradient.

Subsequently, in step S1207, the position where the non-measurement patch is arranged is deleted from the candidate positions.

Furthermore, among positions adjacent to the position where the non-measurement patch is arranged, a position where no patch (or non-measurement patch) is arranged is added to the candidate positions.

The correction image in this embodiment is created through the steps described above.

FIG. 13A is a schematic diagram of the correction image in this embodiment. The darker the color of the patch, the larger the moisture amount. A patch group 1301 with a large moisture amount is arranged in the center of the image, and a patch group 1303 with a small moisture amount is arranged in the peripheral portion. In addition, a non-measurement region 1304 is arranged in the boundary region, and a sudden change in the moisture amount between the patch group 1301 and a patch group 1302 is suppressed.

Effects

According to this embodiment, it is possible to suppress the sheet deformation of the correction image used for the color correction processing, and it is possible to improve the correction accuracy.

Modification

Although the candidate positions are initialized at the image center in step S1204 in the above description, any initial position may be used. For example, if the initial position is set to the upper left of the image, the correction image is as illustrated in the schematic diagram in FIG. 13B.

In addition, although the positions adjacent to each other in the vertical and horizontal directions are referred to in step S1205, oblique directions may be included.

In addition, although an example in which the non-measurement patch is formed using the colorless and transparent primer liquid has been described, any method for applying moisture may be used. For example, any of the CMYK inks may be used. In this case, it is preferable to use a color that is the same as or similar to that of the adjacent patch because the influence of a measurement error due to light diffraction can be reduced.

Other Modifications

Some embodiments of the present disclosure are not limited to what has been directly described above, and may be implemented by combining the elements and concepts described in the described embodiments.

Some embodiments of the present disclosure can also be implemented by processing in which a program for implementing one or more functions in the above-described embodiments is supplied to a system or an apparatus via a network or a storage medium, and one or more processors in a computer of the system or the apparatus read and execute the program. In addition, some embodiments of the present disclosure can also be implemented by a circuit (e.g., an ASIC) that implements one or more functions.

According to the present disclosure, it is possible to provide a characteristic acquisition image by which a characteristic of an image forming apparatus can be acquired while suppressing sheet deformation.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-162595, which was filed on Oct. 7, 2022 and which is hereby incorporated by reference herein in its entirety.

What is claimed is:

1. An image forming apparatus comprising:
a storage unit storing image data of an image having a plurality of regions, the plurality of regions having stepwise different densities, including a first region, a second region, and a third region between the first region and the second region, and satisfying a relationship of a moisture amount in the first region<a moisture amount in the third region<a moisture amount in the second region; and
an image forming unit configured to form the stored image data on a print medium,
wherein a size of the third region is determined from a moisture amount difference between the first region and the second region.

2. The image forming apparatus according to claim 1, wherein signal values of the image data corresponding to the plurality of regions are uniform.

3. The image forming apparatus according to claim 1, wherein the moisture amount in the third region is uniform or has no inflection point.

4. The image forming apparatus according to claim 1, wherein the moisture amount difference between the first region and the second region is larger than a moisture amount difference between a fourth region and a fifth region, which do not have the third region therebetween among the plurality of regions.

5. The image forming apparatus according to claim 1, wherein a region other than a region having a largest moisture amount among the plurality of regions is arranged at an end portion of the image.

6. The image forming apparatus according to claim 1, wherein the image forming apparatus includes a colored recording material and a transparent recording material.

7. The image forming apparatus according to claim 6, wherein the third region is to be recorded using only the transparent recording material.

8. The image forming apparatus according to claim 6, wherein an amount of the transparent recording material in the third region is larger than an amount of a colorless and transparent recording material in the plurality of regions.

9. The image forming apparatus according to claim 1, wherein
the image forming apparatus includes a plurality of types of colored recording materials, and
a type of a colored recording material to be used to record the third region is different from a type of a colored recording material to be used to record the first region and the second region.

10. The image forming apparatus according to claim 1, wherein the image forming apparatus is an inkjet image forming apparatus, and the densities of the plurality of regions are stepwise different in a direction in which the print medium is to be conveyed.

11. An image forming method comprising:
a storage step of storing, by a storage unit, image data of an image having a plurality of regions, the plurality of regions having stepwise different densities, including a first region, a second region, and a third region between the first region and the second region, and satisfying a relationship of a moisture amount in the first region<a moisture amount in the third region<a moisture amount in the second region; and
a forming step of forming, by an image forming unit, the stored image data on a print medium,
wherein a size of the third region is determined from a moisture amount difference between the first region and the second region.

12. A non-transitory computer-readable storage medium storing instructions that, when executed by a computer, cause the computer to perform a method comprising:
a storage step of storing, by a storage unit, image data of an image having a plurality of regions, the plurality of regions having stepwise different densities, including a first region, a second region, and a third region between the first region and the second region, and satisfying a relationship of a moisture amount in the first region<a moisture amount in the third region<a moisture amount in the second region; and a forming step of forming, by an image forming unit, the stored image data on a print medium, wherein a size of the third region is determined from a moisture amount difference between the first region and the second region.

* * * * *